(12) United States Patent
Van De Vrie et al.

(10) Patent No.: US 9,662,837 B2
(45) Date of Patent: May 30, 2017

(54) METHOD FOR PRINTING A THREE-DIMENSIONAL STRUCTURE WITH SMOOTH SURFACES

(71) Applicant: LUXEXCEL HOLDING B.V., Goes (NL)

(72) Inventors: Richard Van De Vrie, Wolphaartsdijk (NL); Joris Biskop, Vlissingen (NL)

(73) Assignee: LUXEXCEL HOLDING B.V., Kruiningen (NL)

( * ) Notice: Subject to any disclaimer, the term of this patent is extended or adjusted under 35 U.S.C. 154(b) by 211 days.

(21) Appl. No.: 14/398,550

(22) PCT Filed: May 6, 2013

(86) PCT No.: PCT/EP2013/059378
§ 371 (c)(1),
(2) Date: Nov. 3, 2014

(87) PCT Pub. No.: WO2013/167528
PCT Pub. Date: Nov. 14, 2013

(65) Prior Publication Data
US 2015/0093544 A1 Apr. 2, 2015

(30) Foreign Application Priority Data
May 8, 2012 (EP) ..................................... 12003588

(51) Int. Cl.
*B29C 41/02* (2006.01)
*B29C 41/52* (2006.01)
(Continued)

(52) U.S. Cl.
CPC ...... *B29C 67/0059* (2013.01); *B29C 35/0805* (2013.01); *B29C 67/0088* (2013.01);
(Continued)

(58) Field of Classification Search
CPC ................ B29C 35/08; B29C 35/0805; B29C 2035/0827; B29C 41/02; B29C 41/52;
(Continued)

(56) References Cited

U.S. PATENT DOCUMENTS 6,165,406 A * 12/2000 Jang .................... B29C 67/0081
264/308
7,497,977 B2 3/2009 Nielsen et al.
(Continued)

FOREIGN PATENT DOCUMENTS

EP 2199065 A1 6/2010
EP 2412767 A1 2/2012
(Continued)

OTHER PUBLICATIONS

International Preliminary Report on Patentability, Application No. PCT/EP2013/059378, dated Aug. 28, 2014.
(Continued)

*Primary Examiner* — Leo B Tenton
(74) *Attorney, Agent, or Firm* — The Dobrusin Law Firm, P.C.

(57) ABSTRACT

The present invention relates to a method for printing a three-dimensional structure with a smooth surface comprising the following steps of depositing multiple droplets of printing material at least partially side by side and one above the other and curing the deposited droplets by light irradiation to build up a three-dimensional pre-structure in a first step, and smoothing at least one surface of the three-dimensional pre-structure by targeted placement of compensation droplets in boundary areas of adjacent deposited droplets and/or in edges of the surface to be smoothed in a second step to build up the three-dimensional structure with a smooth surface.

11 Claims, 3 Drawing Sheets

(51) Int. Cl.

| | | |
|---|---|---|
| *B29C 67/00* | (2017.01) | |
| *B29C 35/08* | (2006.01) | |
| *B29D 11/00* | (2006.01) | |
| *B33Y 10/00* | (2015.01) | |
| *B33Y 50/02* | (2015.01) | |
| *B33Y 80/00* | (2015.01) | |
| *B29K 105/00* | (2006.01) | |

(52) U.S. Cl.
CPC .. *B29C 67/0092* (2013.01); *B29C 2035/0827* (2013.01); *B29D 11/00442* (2013.01); *B29K 2105/0002* (2013.01); *B29K 2105/0058* (2013.01); *B29K 2995/0073* (2013.01); *B33Y 10/00* (2014.12); *B33Y 50/02* (2014.12); *B33Y 80/00* (2014.12); *Y10T 428/24479* (2015.01)

(58) Field of Classification Search
CPC . B29C 67/0059; B29C 67/0088; B29C 71/04; B29K 2995/0073
USPC .................. 264/40.1, 308, 406, 494, 496
See application file for complete search history.

(56) References Cited

U.S. PATENT DOCUMENTS

| | | | |
|---|---|---|---|
| 7,875,321 B2* | 1/2011 | Verhoest | ............... B41C 1/003 |
| | | | 427/140 |
| 2002/0171177 A1 | 11/2002 | Kritchman et al. | |
| 2005/0025905 A1 | 2/2005 | Pan | |
| 2005/0248065 A1 | 11/2005 | Owada | |
| 2009/0085256 A1* | 4/2009 | Mataki | ............... B41M 7/0081 |
| | | | 264/401 |
| 2009/0244230 A1 | 10/2009 | Ohnishi et al. | |
| 2009/0267269 A1* | 10/2009 | Lim | .................... B29C 67/0059 |
| | | | 264/401 |
| 2010/0195122 A1 | 8/2010 | Kritchman | |
| 2010/0221504 A1 | 9/2010 | Bauer | |
| 2013/0286073 A1 | 10/2013 | Blessing | |

FOREIGN PATENT DOCUMENTS

| | | |
|---|---|---|
| EP | 2447045 A2 | 5/2012 |
| EP | 2474404 A1 | 7/2012 |
| EP | 2396682 B1 | 5/2013 |
| FR | 2948175 A1 | 1/2011 |
| WO | 2006/029268 A2 | 3/2006 |
| WO | 2009/120394 A2 | 10/2009 |
| WO | 2010/091888 A1 | 8/2010 |
| WO | 2011/011818 A1 | 2/2011 |
| WO | 2013/167415 A1 | 11/2013 |

OTHER PUBLICATIONS

International Search Report, Application No. PCT/EP2013/059378 dated Jul. 26, 2013.
Potentially related U.S. Appl. No. 14/398,561, filed Nov. 3, 2014, published as WO2013/167415.

* cited by examiner

METHOD FOR PRINTING A THREE-DIMENSIONAL STRUCTURE WITH SMOOTH SURFACES

BACKGROUND

The present invention relates to a method for three-dimensional structures. Suchlike printing methods are commonly known. For example, the international patent application WO 2010/091 888 A1 discloses a method for printing light-directing structure onto a substrate, wherein the light-directing structure is built up from a plurality of droplets of a substantially transparent material, which are printed e.g. by means of an inkjet printer one above the other and side by side onto substrate.

It is known from the prior art that the surface of printed structures can be smoothed by post processing, like grinding, sanding, waterblasting, lacquering and the like, in order to get a high quality smooth and plane surface. A disadvantage of this approach is that suchlike post processing increases the manufacturing time and generates additional costs because the printed article has to be inserted into an additional post processing tool after the printing procedure. Especially because the printed article has to be accurately positioned and orientated in the additional post processing tool.

SUMMARY

It is therefore an object of the present invention to provide a method for printing three-dimensional structures in such a manner that the three-dimensional structure has initially a smooth surface after printing, so that expensive and time-consuming steps of post processing can be completely avoided.

The object of the present invention can be achieved with a method for printing a three-dimensional structure with a smooth surface comprising the steps of depositing multiple droplets of printing material at least partially side by side and one above the other and curing the deposited droplets by light irradiation to build up a three-dimensional pre-structure in a first step and smoothing at least one surface of the three-dimensional pre-structure by targeted placement of compensation droplets in boundary areas of adjacent deposited droplets and/or in edges of the surface to be smoothed in a second step to build up the three-dimensional structure with a smooth surface.

It is herewith advantageously possible to print a three-dimensional structure with at least one smooth surface because edges and other geometric irregularities in the surface of the pre-structure deriving from the actual printing process are smoothened by the placement of the compensation droplets. This approach allows to rework the surface of the pre-structure with an additional printing procedure e.g. inside of the printer, so that other types of post-processing steps requiring additional post-processing tools are not needed any more for providing printed three-dimensional structures with high quality smooth surfaces. Furthermore, the pre-structure can be printed in a short time e.g. by using bigger and fast curing monomer or polymer droplets, wherein the intensive and time consuming smoothening of the structure is done only there where it is needed. As a consequence, the manufacturing time and the production costs for printed articles with suchlike three-dimensional structures can be reduced substantially compared to the prior art. The printing material comprises preferably a printing ink, e.g. a transparent or translucent printing ink for printing an article with light directing structures, like lenses (convex, concave or Fresnel lenses), prisms or light conductors, or a colored printing ink for printing almost any solid article. It is conceivable that different printing ink having different colors are used in order to build up colored and/or patterned three-dimensional structures. Preferably, the printing ink comprises an UV curable liquid monomer which becomes a polymer by curing. Preferably, the droplets are printed onto a substrate. The substrate can be a part of the printed article or a support plate for supporting the deposited droplets only during the printing process. It is conceivable that the smoothed surface of the three-dimensional structure is coated with a compensation layer for compensating any remaining irregularities onto the smoothed surface.

According to a preferred embodiment of the present invention, the locations of the compensation droplets are calculated in dependency of the locations of the deposited droplets. Preferably, the droplets for building up the pre-structure are ejected from a print head. First, the positions of the individual droplets for building up the pre-structure are calculated (these information are referred to as printing data) and afterwards the print head is moved to the calculated positions in order to deposit a certain droplet in the desired position. The required number, positions and/or sizes of compensation droplets for smoothing the surface of the pre-structure can be calculated from the known positions of droplets forming the pre-structure because the information of where edges and other irregularities in the shape of the pre-structure exist can be derived directly from the printing data. Preferably, a 3D model of the printed pre-structure is calculated based on the printing data and an algorithm is used for finding edges and other irregularities in the shape of the 3D model and to calculate how the edges and other irregularities can be smoothened by means of compensation droplets. Subsequently, the determined compensation droplets needed to smoothen the surface are printed by the print head.

According to another preferred embodiment of the present invention, the shape of the surface of the pre-structure is measured in an intermediate step, performed between the first and the second step, and the locations of the compensation droplets are calculated in dependency of the measured shape of the pre-structure. It is herewith advantageously possible to smoothen the surface of the pre-structure with compensation droplets which are deposited onto the pre-structure in dependency of the actual shape of the pre-structure. This approach advantageously allows to compensate also deviations in the surface of the pre-structure which cannot be predicted theoretically. The measuring step is performed e.g. with an optical camera. Furthermore, it is conceivable that a print head with measurement means as disclosed in the European patent application (application number EP11000072.6, not yet published) is used for performing the method according to the present invention, wherein the actual shape of the pre-structure is measured by the measurement means. The disclosure of this European patent application number EP11000072.6 is herewith incorporated by reference.

According to another preferred embodiment of the present invention, the compensation droplets deposited in the second step have a smaller mean diameter than the droplets deposited in the first step. It is herewith advantageously possible to build up the pre-structure comparatively fast and to compensate also small irregularities in the surface of the pre-structure in order to generate a high quality smooth surface. Preferably, the compensation droplets deposited in the second step are cured in the second step by light irradiation.

According to another preferred embodiment of the present invention, the compensation droplets deposited in the second step are cured only after a certain time period has expired in order to let the deposited compensation droplets spread out and/or melt with adjacent deposited droplets before they get cured. This approach allows the compensation droplets to at least partially spread out and melt with adjacent deposited droplets of the pre-structure before hardening completely, so that the smoothness of the surface can be improved.

According to another preferred embodiment of the present invention the droplets are cured by a first UV light in the first step and wherein the compensation droplets are cured by a second UV light in the second step, wherein the second UV light has a different wavelength spectrum than the first UV light. It is herewith possible to cure only the droplets for building up the pre-structure or to cure only the compensation droplets. Preferably, the wavelength of the second UV light is set in such a manner that the compensation droplets deposited in the second step are cured slower than the droplets deposited in the first step. This approach allows to built up the pre-structure in a comparatively short time, wherein the compensation droplets get sufficient time to flow over in order to compensate the corresponding irregularity of the surface. The expenditure of time is maintainable because the compensation droplets are placed only in such sections of the surface which has to be smoothened. It is conceivable that the amount of the first UV light is varied during the curing progress performed in the second step. Preferably, the compensation droplets deposited in the second step are made from another material than the droplets deposited in the first step. Particularly preferably, the compensation droplets have a higher or lower viscosity than the droplets deposited in the first step. It is herewith advantageously possible to increase the overall manufacturing time by using bigger and fast curing monomer or polymer droplets for building up the pre-structure and by using smaller and slow curing monomer or polymer droplets of higher lower viscosity as compensation droplets.

Another subject or another preferred embodiment of the present invention is a method for printing a three-dimensional structure with a smooth surface, in particular according to one of the preceding claims, comprising the following steps: Depositing multiple droplets of printing material at least partially side by side and one above the other and curing the deposited droplets by light irradiation to build up a three-dimensional structure, wherein UV light with different penetration capabilities is used in the first step for curing deposited droplets located inside of the three-dimensional structure.

It is herewith advantageously possible to cure certain droplets arranged inside of the structure and beneath the upper surface of the three-dimensional structure depending on their position. If UV light with higher penetration capability is used, droplets located deeper below the upper surface can be cured. The usage of UV light with lower penetration capability can be used for curing droplets located closer to the upper surface. The penetration capability depends inter alia on the wavelength of the UV light. Preferably, an UV light source is controlled in such a manner that curing inside of the three-dimensional structure is performed faster than curing in the periphery of the three-dimensional structure. This could be done by selecting an UV light with higher penetration capability, e.g. UV light with a lower wavelength section or a higher light intensity. If the droplets located at the outer surface of the printed three-dimensional structure are less or slower cured during curing the three-dimensional structure, these droplets have more time to flow out and deliquesce, so that a smooth surface with fewer irregularities is provided.

According to another preferred embodiment of the present invention, the a light cone of UV light is directed towards the deposited droplets having a wavelength and/or intensity gradient for curing the deposited droplets, wherein preferably the wavelength and/or intensity gradient extends parallel to a main plane of the three-dimensional structure and/or a substrate of the three-dimensional structure. The three-dimensional structure can build up with a complex form and geometry. If only those droplets should be cured, which are located close to the outer surface of the three-dimensional structure, the light cone of the UV light has to be adapted, at least roughly, to the form of the three-dimensional structure. A light cone with a wavelength gradient and/or a light intensity gradient allows to vary the penetration capability of the UV light in dependency of the shape of the three-dimensional structure. This approach allows e.g. to irradiate the three-dimensional structure only in those areas with UV light of lower wavelength or higher intensity, where the height of the three-dimensional structure is increased, so that the droplets located near the outer surface of the structure in areas with lower heights can flow out and smoothen the outer surface of the structure.

According to another preferred embodiment of the present invention, the UV light is provided in a pulsed manner, so that the intensity of the light and in particular the intensity gradient can be controlled in a comparatively simple way by selecting a certain pulse length or a certain time interval between the pulses of UV light. The intensity gradient can be adapted by amending the pulse length or the number or the lengths of the time intervals between subsequent light pulses.

Another subject or another preferred embodiment of the present invention is a method for printing a three-dimensional structure with a smooth surface, in particular according to one of the preceding claims, comprising the following steps: Depositing multiple droplets of printing material at least partially side by side and one above the other onto a substrate and curing the deposited droplets by light irradiation to build up a three-dimensional mould in a preparation step, depositing multiple droplets of printing material at least partially side by side and one above the other in the mould and curing the deposited droplets by light irradiation to build up a three-dimensional structure at least partially inside of the mould in a manufacturing step and separating the three-dimensional structure from the mould in a separation step.

It is herewith advantageously possible to generate a three-dimensional structure with a complex outer shape at all sides. In particular, the lower side can be build up with any desired geometrical form and does not always have to be a flat plane. In contrast, the lower side of structures printed by printing method known from the prior art have always a flat bottom because the droplets are deposited only onto a flat substrate. Another advantage of the present method is that it allows to generate a three-dimensional structure with very smooth surfaces because the lower surface of the three-dimensional structure facing the upper surface of the mould is comparatively smooth, when the upper surface of the mould has been smoothened by using e.g. compensation droplets, finishing layers and/or UV light with a wavelength gradient.

According to preferred embodiment of the present invention, the upper surface of the mould and/or the upper surface of the three-dimensional structure is smoothed by depositing compensation droplets in boundary areas of adjacent deposited droplets building up the surface and/or near edges of the surface in the preparation step or in the manufacturing step. Preferably, the preparation step and/or the manufacturing step comprises the first and/or second step as explained above.

According to another preferred embodiment of the present invention, in the separation step the three-dimensional structure is removed from the mould. The three-dimensional structure is simply taken out of the mould. Alternatively, the mould is dissolved by means of a solvent, so that the three-dimensional structure is freed from the mould.

According to another preferred embodiment of the present invention, the printing material for printing the droplets in the preparation step differs from the printing material for printing droplets in the manufacturing step, so that material with different physical characteristics can be selected for producing the mould on the one hand and for producing the three-dimensional structure on the other hand. It is e.g. conceivable that the printing material for building up the mould is very low-cost and fast-curing printing ink in order to decrease the manufacturing costs for the mould.

According to another preferred embodiment of the present invention, the droplets forming the mould are completely hardened by an additional curing step before performing the manufacturing step. It is herewith advantageously possible to assure that the printing ink for building up the three-dimensional structure does not connect with the mould material, so that a later separation of the three-dimensional structure from the mould is always possible.

According to another preferred embodiment of the present invention, the surface of the mould is coated with a separation layer between the preparation step and the manufacturing step. This approach assures that a simple separation of the three-dimensional structure from the mould is possible without damage of the three-dimensional structure. Preferably, the surface of the mould is coated with a finishing layer for smoothing the upper surface of the mould, so that a three-dimensional structure with a smooth underside can be manufactured in the manufacturing step.

Another subject or another preferred embodiment of the present invention is a method for printing a three-dimensional structure with a smooth surface, in particular according to one of the preceding claims, comprising the following steps: Depositing multiple droplets of printing material at least partially side by side and one above the other onto a substrate and curing the deposited droplets by light irradiation to build up a three-dimensional pre-structure in a first step, rotating the pre-structure in an intermediate step, depositing multiple droplets of printing material at least partially side by side and one above the other onto a surface of the pre-structure and curing the deposited droplets by light irradiation to build up a three-dimensional sub-structure in a second step, wherein the three-dimensional structure is formed by the pre-structure and the sub-structure.

It is herewith advantageously possible to generate a three-dimensional sub-structure onto the underside of the three-dimensional pre-structure when the pre-structure is turned around and therefore faces the ejection nozzles of the print head. The three-dimensional sub-structure and the three-dimensional pre-structure form together the finished printed article comprising the three-dimensional structure. This approach allows to print a three-dimensional structure with a complex outer shape at all sides. In particular, the lower side can be build up with any desired geometrical form and does not always have to be a flat plane. Another advantage of the present method is that it allows to generate a three-dimensional structure with very smooth surfaces because all outer surface can be smoothed by using e.g. compensation droplets, finishing layers and/or UV light with a wavelength gradient. The person skilled in art understands that the first step for building up the pre-structure and/or the second step for building up the sub-structure preferably comprises the first and the second step of the method for printing a three-dimensional structure with a smooth surface according to claim 1, so that the surface of the pre-structure and/or the surface of the sub-structure are smoothened by compensating droplets.

According to another preferred embodiment of the present invention, support means are printed onto a substrate before the rotated three-dimensional pre-structure are located onto the substrate in a substep performed between the intermediate step and the second step. The support means is provided for accurately locating the rotated pre-structure and fixing the rotated pre-structure during the second step.

According to another preferred embodiment of the present invention, the pre-structure is rotated 180 degrees around a rotating axis extending parallel to the substrate in the intermediate step, so that further droplets can be printed directly onto the underside of the pre-structure.

According to another preferred embodiment of the present invention, the pre-structure is rotated together with at least a part of the substrate in the intermediate step. It is herewith advantageously possible that at least a part of the substrate becomes part of the later three-dimensional structure by printing the pre-structure onto the one side of the substrate and by printing the other sub-structure onto the other side of the substrate after turning around the substrate. Preferably, the part of the substrate containing the pre-structure is cut out of the surrounding substrate material before turning the substrate together with the pre-structure.

According to another preferred embodiment of the present invention, the pre-structure is fixed by carrier means after rotating in the intermediate step. The carrier comprises preferably a negative form of the shape of the pre-structure, so that the pre-structure can be held by the carrier in a fixed position during the second step.

Another subject of the present invention is a method for controlling a print head, in particular of an inkjet printer, for performing a method according to the present invention.

Another subject of the present invention is a printed article comprising a three-dimensional structure printed by a method according to the present invention. Preferably, the three-dimensional-structure comprises a three-dimensional pre-structure built up by multiple droplets of printing material arranged at least partially side by side and one above the other, wherein the three-dimensional structure further comprises multiple compensation droplets placed in boundary areas of adjacent deposited droplets and/or in edges of the surface of the pre-structure for smoothing the surface of the three-dimensional pre-structure. As explained above, the printed article is provided with a high quality smoothed surface, wherein the production time and the manufacturing costs are significantly lower compared to the prior art.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

DETAILED DESCRIPTION

Figure 1A:
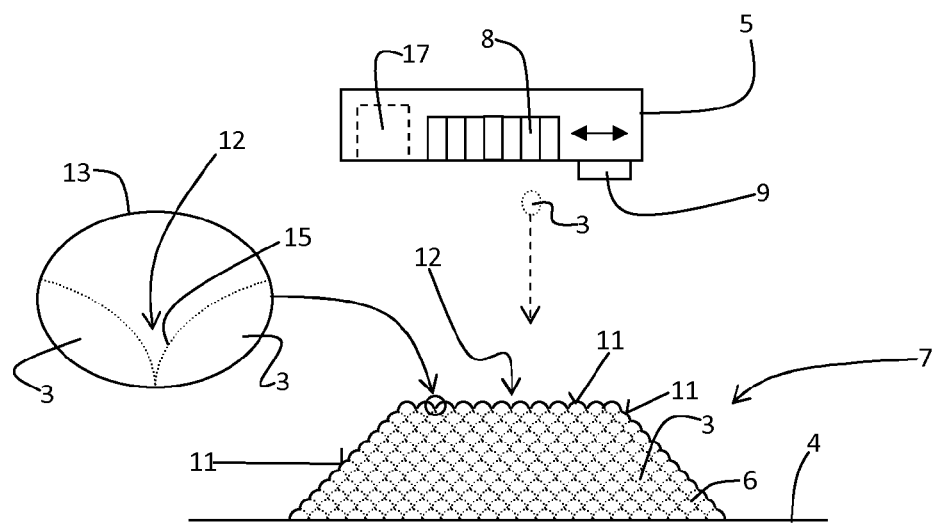
FIGS. 1A and 1B illustrate a method for printing a three-dimensional structure with smooth surfaces and a printed article comprising a three-dimensional structure with smooth surface respectively according to a first exemplary embodiment of the present invention.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described of illustrated herein.

In FIG. 1A, a first step 10 of the method for printing a three-dimensional structure 1 with smooth surfaces 2 according to a first exemplary embodiment of the present invention is shown. In the first step 10, a plurality of droplets 3 of printing ink are deposited onto a substrate 4 by means of a print head 5 in order to build up a three-dimensional pre-structure 7. The droplets 3 are deposited side by side and one above the other, as indicated by the dashed lines 6, in order to build generate the three-dimensional form. The printing ink comprises a UV curable liquid monomer with a certain viscosity which becomes a polymer if being cured. The print head 5 moves over the substrate 4 and ejects the droplets 3 of printing ink by means of ejecting nozzles 8 to deposit the individual droplets 3 in a certain pattern. After deposition of the droplets 3, adjacent deposited droplets 3 merge which each other (the droplets 3 are therefore illustrated only schematically by the dashed lines 6) and are subsequently cured by UV-light emitted by LED's (light emitting diodes) 9 of the print head 5. It can be seen from FIG. 1A that the upper surfaces 11 of the pre-structure 7 is interspersed with irregularities deriving from the edges 12 between the boundary areas 15 of those adjacent droplets 3 which are deposited near the upper surfaces 11. The edges 12 are illustrated in a detailed view 13.

Figure 1B:
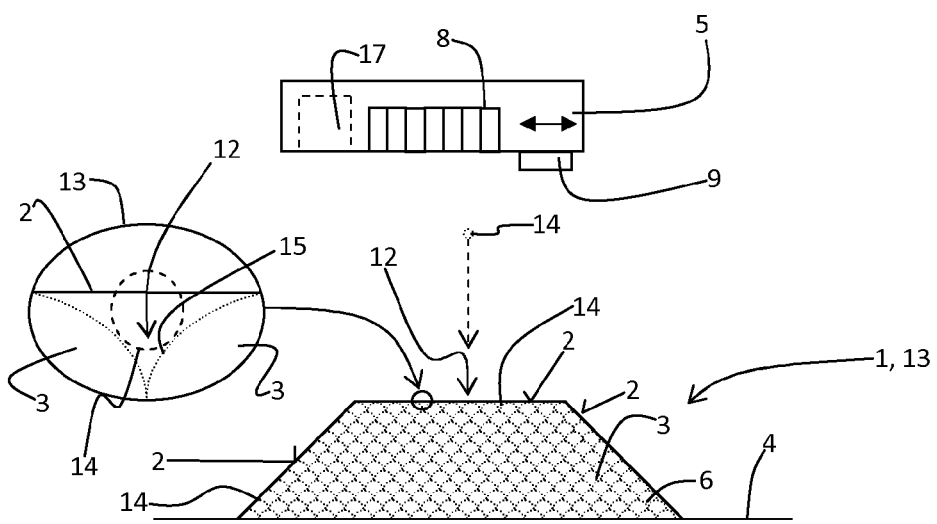

In FIG. 1B, the second step 10 of the method for printing the three-dimensional structure 1 with smooth surfaces 2 according to the first exemplary embodiment of the present invention is shown. In the second step, compensation droplets 14 are deposited in the boundary areas 15 of the adjacent droplets 3 which are deposited near the upper surfaces 11 of the pre-structure 7. The compensation droplets 14 are smaller than the droplets 3 deposited in the first step. Furthermore, the compensation droplets 14 comprises a compensation ink different from the printing ink, wherein the compensation ink comprises at least a higher viscosity then the printing ink. The compensation droplets 14 are not cured immediately after depositing, so that the compensation ink can flow into the gaps between the adjacent droplets 3 and flatten the upper surface of the pre-structure 7, so that a three-dimensional structure 1 with smooth surfaces 2 is generated. The process of filling up the gaps is shown in the detailed view 13. Afterwards, the compensation droplets 14 are cured by UV light, preferably the UV light comprises a different wavelength as the UV light used in the first step for curing the droplets 3. In this manner, all surfaces 2 of the three-dimensional structure 1 can be smoothed. If the surface 2 to be flattened is inclined (cp. the obliquely running sidewalls of the structure), the step of curing the compensation droplets 14 is performed at an earlier stage to prevent draining off of the compensation ink. FIG. 1B illustrates also printed article 16 comprising a three-dimensional structure 1.

In principle, the number, the positions and the sizes of the compensation droplets 14 required for providing a smooth surface 2 can be determined in two different ways. Either the number, the positions and the sizes are calculated from a theoretical 3D model or the number, the positions and the sizes are calculated in dependency of measurement data. Of course, also a combination of these two ways is conceivable. According to the first way, the theoretical 3D model of the surface of the printed pre-structure 7 is calculated from the known positions of droplets 3 deposited by the print head 5. Now, it is possible to determine the existence, the positions and the form of any edges 12 and other irregularities in the surfaces 11 of the pre-structure 7 from the 3D model. Furthermore, it can be calculated how the edges 12 and other irregularities can be smoothened by means of compensation droplets 14 and the required number, positions and sizes of the compensation droplets 14 are determined. According to the second way, the surfaces 11 of the pre-structure 7 are measured by measurement means 17. The corresponding measurement data are analyzed to identify any edges 12 and other irregularities in the surfaces 11 of the pre-structure 7 and to determine the required number, positions and sizes of the compensation droplets 14 for compensating and smoothing the identified edges 12 and other irregularities in the surfaces 11 of the pre-structure 7.

Figure 2:
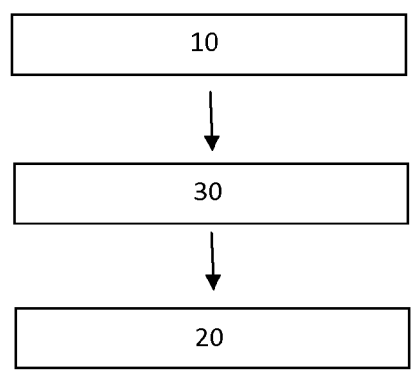
FIG. 2 illustrates schematically a method for printing a three-dimensional structure with smooth surfaces according to the first exemplary embodiment of the present invention.

In FIG. 2, the individual step of the method for printing the three-dimensional structure 1 with smooth surfaces 2 according to the first exemplary embodiment of the present invention is shown, again. In the first step 10, the pre-structure 7 is printed by depositing a plurality of individual droplets 3 of printing ink onto a substrate 3. In an intermediate step 30, any edges 12 and other irregularities in the surfaces 11 of the pre-structure 7 are identified and the required number, positions and sizes of the compensation droplets 14 for compensating and smoothing the identified edges 12 and other irregularities in the surfaces 11 of the pre-structure 7 are determined. In the second step, the surfaces of the three-dimensional pre-structure 7 are smoothed by targeted placement of compensation droplets 14 in boundary areas 15 of adjacent deposited droplets 3 and/or in edges 12 of the surfaces 11 to be smoothed to build up the three-dimensional structure 1 with smooth surfaces 2.

Figure 3A:
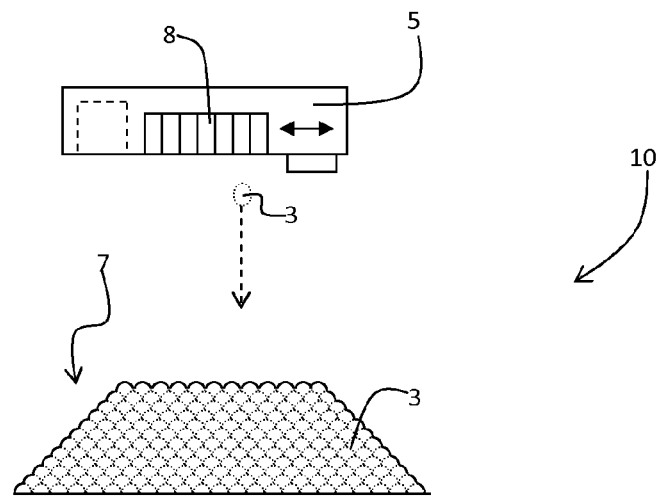
FIGS. 3A, 3B and 3C illustrate a method for printing a three-dimensional structure and a printed article comprising a three-dimensional structure respectively according to a second exemplary embodiment of the present invention.
Figure 3B:
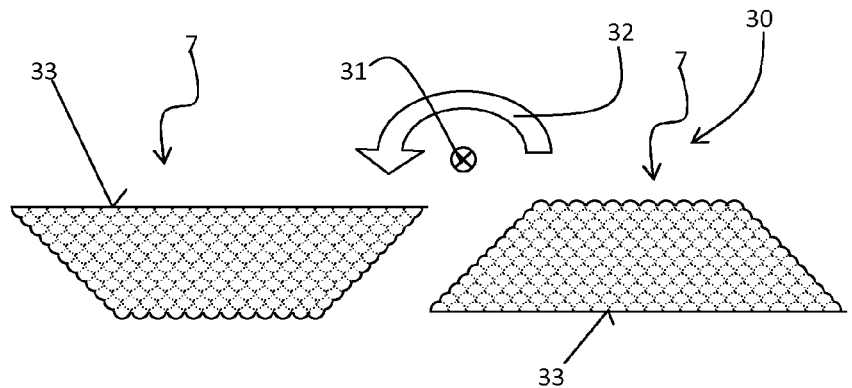
Figure 3C:
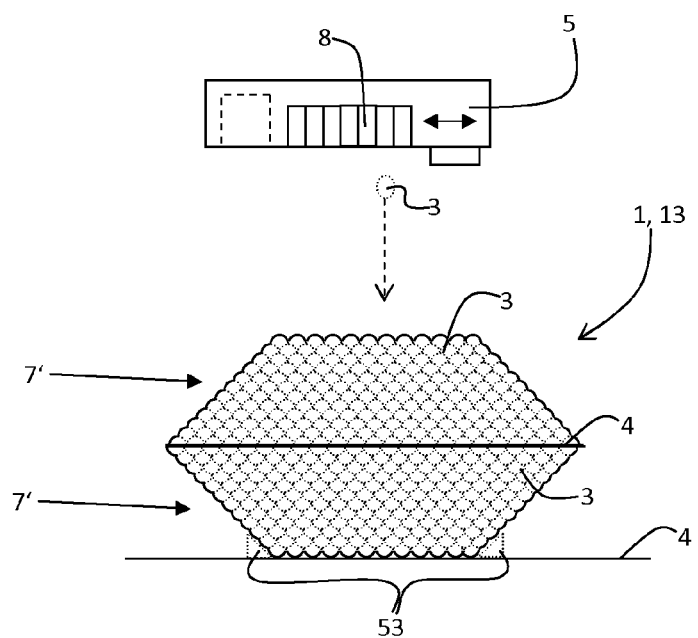

In FIGS. 3A, 3B and 3C a method for printing a three-dimensional structure 1 and a printed article 16 comprising a three-dimensional structure 1 respectively according to a second exemplary embodiment of the present invention is shown. In a first step, a pre-structure 7 is printed, preferably onto a substrate 4 (not shown), in the same way as the pre-structure 7 or the structure 1 in the method according to the first embodiment of the present invention, explained with reference to FIGS. 1A and/or 1B. In a subsequent intermediate step 30, the pre-structure 7 is rotated 180 degrees about a horizontal rotating axis 31, so that a former underside 33 of the pre-structure 7 faces the ejecting nozzles 8 of the print head 5. The rotating movement is illustrated as arrow 32. In a following second step 20, a three-dimensional sub-structure 7' is printed onto the former underside 33 of the pre-structure 7 by depositing again droplets 6 of printing material one above the other and side by side. The pre-structure 7 and the sub-structure 7' together form the finished three-dimensional structure 1 and the printed article 16 comprising the three-dimensional structure 1. It is also conceivable that the pre-structure 7 is rotated in the intermediate step 30 together with a part of the substrate 4, so that the sub-structure 7' is printed onto the former underside 33 of the substrate 4 in the second step 20. It is also conceivable that support means 53 are printed onto the substrate 4 in a substep before the rotated pre-structure 7 is located in order to accurately position the pre-structure 7 onto the support means 53 and to hold the pre-structure 7 in place during printing of the sub-structure 7' by the support means 53. Preferably, the first step for building up the pre-structure 7 and/or the second step for building up the sub-structure 7' comprises the first and the second step 10, 20 of the method for printing a three-dimensional structure with a smooth surface according to claim 1, so that the surface of the pre-structure 7 and/or the surface of the sub-structure 7' are smoothened by compensating droplets 14 as explained in FIGS. 1A and 1B.

Figure 4A:
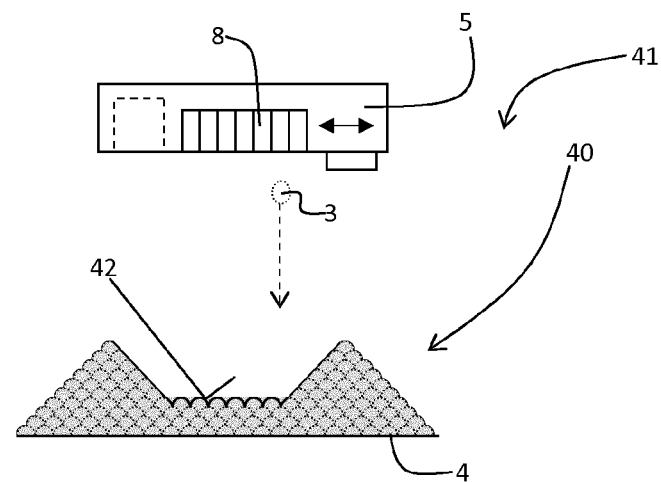
FIGS. 4A and 4b illustrate a method for printing a three-dimensional structure and a printed article comprising a three-dimensional structure respectively according a third exemplary embodiment of the present invention.
Figure 4B:
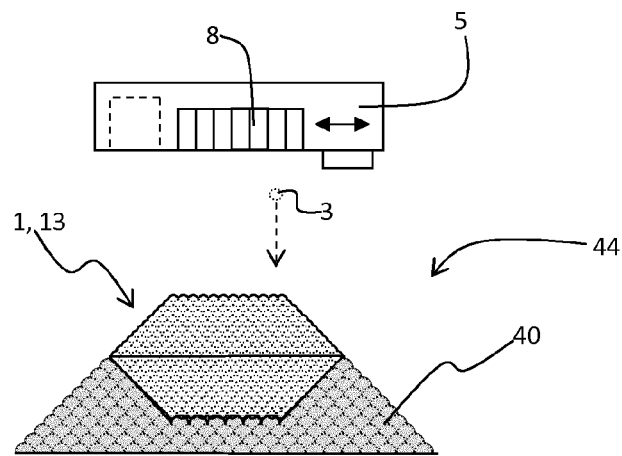

In FIGS. 4A and 4b, a method for printing a three-dimensional structure 1 and a printed article 16 comprising a three-dimensional structure 1 respectively according a third exemplary embodiment of the present invention is shown. In an initial preparation step 41, a structure is printed onto a substrate 4 in order to build up a mould 40. The mould 40 is built up in the same way as the pre-structure 7 or the structure 1 in the method according to the first embodiment of the present invention, explained with reference to FIGS. 1A and/or 1B by depositing a plurality of droplets 3 side by side and one above the other (optionally also compensation droplets 14 are deposited). Afterwards, the mould 40 is completely hardened by UV curing and the upper surface 42 of the mould 40 is optionally coated with a finishing layer 43 for compensating any irregularities in the upper surface 42. It is conceivable that the upper surface 42 is furthermore coated with a separation layer, e.g. a material comprising Polytetrafluoroethylene (PTFE), for reducing adhesion between the upper surface 42 and further structures to be printed onto the upper surface 42. FIG. 4B shows a subsequent manufacturing step 44 in which further droplets 3, preferably with a smaller diameter, are deposited inside and onto the mould 40. Again, the droplets 3 are deposited side by side and one above the other in order to build up a three-dimensional structure 1, whereby the outer shape of this structure 1 corresponds at least partially to the mould 40. The mould 40 serves as a negative form for the underside of the three-dimensional structure 1 to be printed. After curing the three-dimensional structure 1, the three-dimensional structure 1 is removed from the mould 40 in a separation step (not shown). This approach allows to build up a three-dimensional structure 1 without using substrate 4. Here, the three-dimensional structure 1 is already the printed article 16 in the sense of the present invention. Preferably, the upper surface of the mould 40 and/or the upper surface of the three-dimensional structure 1 is smoothed by depositing compensation droplets 14 in boundary areas 15 of adjacent deposited droplets 3 building up the surface and/or near edges 12 of the surface in the preparation step 41 and/or in the manufacturing step 44. Preferably, the preparation step 41 and/or the manufacturing step 44 comprises the first and second step 10, 20 as explained in FIGS. 1A and 1B.

Figure 5:
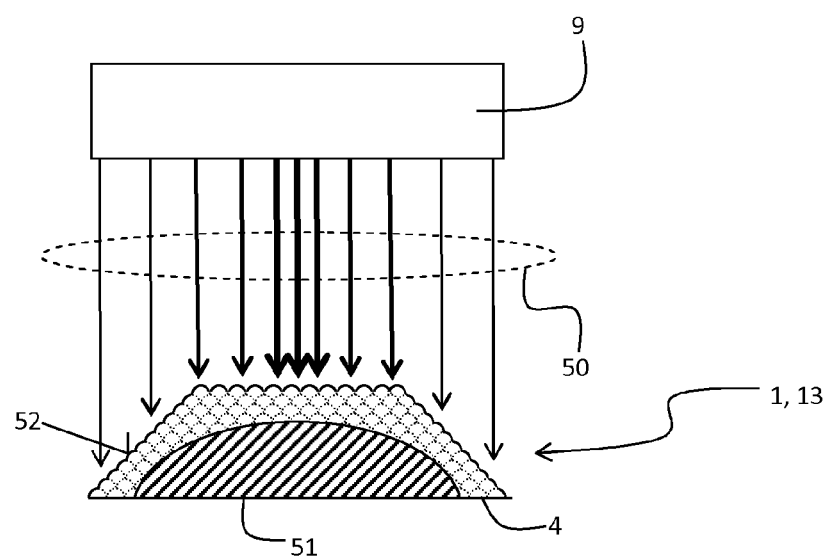
FIG. 5 illustrates a method for printing a three-dimensional structure and a printed article comprising a three-dimensional structure respectively according a fourth exemplary embodiment of the present invention.

In FIG. 5, a method for printing a three-dimensional structure 1 and a printed article 16 comprising a three-dimensional structure 1 respectively according a fourth exemplary embodiment of the present invention. In a first step, a three-dimensional structure 1 is printed onto a substrate 4 in the same way as the pre-structure 7 or the structure in the method according to the first embodiment of the present invention, explained with reference to FIGS. 1A and/or 1B. Afterwards, the whole three-dimensional structure 1 is irradiated with a light cone of UV light emitted from an UV light source 9. The light cone comprises a wavelength gradient and/or an intensity gradient in the UV light. With other words: The wavelength range and/or the intensity of the UV light varies within the light cone 50. In the present example, the wavelengths in the centre of the light cone 50 are shorter than the wavelengths in the periphery of the light cone 50 or the light intensity in the centre of the light cone 50 is higher than the light intensity in the periphery of the light cone 50. This approach provides higher penetration capabilities of the UV light in the centre of the three-dimensional structure 1 compared to the penetration capabilities of the UV light in the periphery of the three-dimensional structure 1. The wavelength range and/or light intensity gradient is adapted to the shape of the three-dimensional structure 1, so that UV light with higher penetration capabilities is used to cure areas of the three-dimensional structure 1 with greater heights and UV light wither lower penetration capabilities is used to cure areas of the three-dimensional structure 1 with lower heights. The results is that a core 51 of the three-dimensional structure 1 is completely hardened very fast, wherein the upper surface 52 of the three-dimensional structure 1 is cured very slow, so that the droplets 3 located near the upper surface 52 are able to flow out and melt with each other. In this manner, irregularities and edges in the plane of the upper surface 52 gets compensated, so that smoothed upper surface 52 is provided.

REFERENCE SIGNS 1 three-dimensional structure
2 smooth surface
3 droplet
4 substrate
5 print head
6 dashed line
7 pre-structure
7' sub-structure 8 ejecting nozzle
9 light emitting diode
10 first step
11 surfaces of the pre-structure
12 edge
13 detailed view
14 compensation droplet
15 boundary area
16 printed article
17 measurement means
20 second step
30 intermediate step
31 rotating axis
32 arrow
33 underside
40 mould
41 preparation step
42 upper surface
43 finishing layer
44 manufacturing step
50 light cone
51 core
52 upper surface
53 support means

What is claimed is:

1. A method for printing a three-dimensional structure with a smooth surface comprising the following steps:
    depositing multiple droplets of printing material at least partially side by side and one above the other,
    curing the deposited droplets by, light irradiation to build up a three-dimensional pre-structure in a first step; and
    smoothing at least one surface of the three-dimensional pre-structure by targeted placement of compensation droplets in boundary areas of adjacent deposited droplets and/or near edges of the surface to be smoothed in a second step to build up the three-dimensional structure with a smooth surface;
    wherein the compensation droplets deposited in the second step have a smaller mean diameter than the droplets deposited in the first step, and
    wherein the compensation droplets deposited in the second step are cured in the second step by light irradiation.

2. The method according to claim 1, wherein locations of the compensation droplets are calculated in dependency of locations of the deposited droplets.

3. The method according to claim 1, wherein a shape of the surface of the pre-structure is measured in an intermediate step, performed between the first and the second step, and the locations of the compensation droplets are calculated in dependency of the measured shape of the pre-structure.

4. The method according to claim 1, wherein the compensation droplets deposited in the second step are cured only after a certain time period has expired in order to let the deposited compensation droplets spread out and/or melt with adjacent deposited droplets before they get cured.

5. The method according to claim 1, wherein in the second step compensation droplets are deposited which are made from another material than the droplets deposited in the first step, and the compensation droplets have a higher viscosity than the droplets deposited in the first step.

6. The method according to claim 2, wherein a shape of the surface of the pre-structure is measured in an intermediate step, performed between the first and the second step, and the locations of the compensation droplets are calculated in dependency of the measured shape of the pre-structure.

7. The method according to claim 2, wherein the compensation droplets deposited in the second step are cured only after a certain time period has expired in order to let the deposited compensation droplets spread out and/or melt with adjacent deposited droplets before they get cured.

8. The method according to claim 6, wherein the compensation droplets deposited in the second step are cured only after a certain time period has expired in order to let the deposited compensation droplets spread out and/or melt with adjacent deposited droplets before they get cured.

9. The method according to claim 2, wherein in the second step compensation droplets are deposited which are made from another material than the droplets deposited in the first step, and the compensation droplets have a higher viscosity than the droplets deposited in the first step.

10. The method according to claim 3, wherein in the second step compensation droplets are deposited which are made from another material than the droplets deposited in the first step, and the compensation droplets have a higher viscosity than the droplets deposited in the first step.

11. The method according to claim 8, wherein in the second step compensation droplets are deposited which are made from another material than the droplets deposited in the first step, and the compensation droplets have a higher viscosity than the droplets deposited in the first step.

* * * * *